Figure 1:
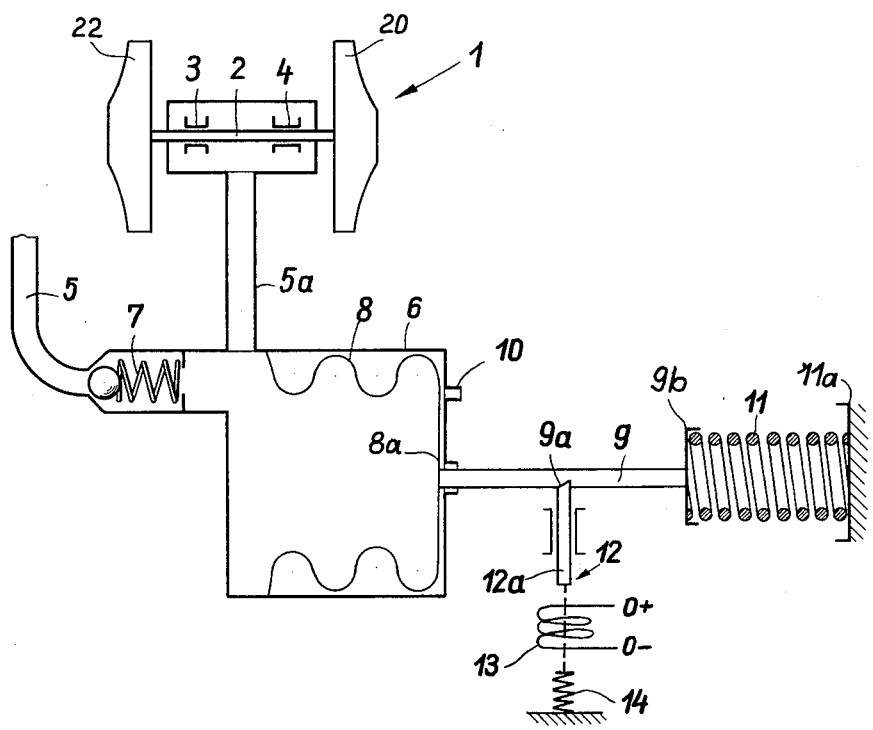

June 23, 1964   S. KOFINK ETAL   3,138,221
LUBRICATING SYSTEM
Filed Oct. 30, 1961   2 Sheets-Sheet 2

Inventors:
SIEGFRIED KOFINK
GUSTAV ZELLBECK
BY: M Glew and Toren
ATTORNEYS

United States Patent Office 3,138,221
Patented June 23, 1964

1

3,138,221
LUBRICATING SYSTEM
Siegfried Kofink, Zell (Neckar), and Gustav Zellbeck, Hegensberg, Esslingen, Germany, assignors to J. Eberspächer, Esslingen (Neckar), Germany, a firm of Germany
Filed Oct. 30, 1961, Ser. No. 148,543
Claims priority, application Germany Dec. 8, 1960
1 Claim. (Cl. 184—6)

This invention relates in general to a lubricating system and in particular to a new and useful device for insuring delivery of a lubricating fluid to moving parts of an engine, particularly on start-up.

The present invention has particular application in connection with supplying of a liquid lubricant such as oil to a rotating bearing portion of an apparatus such as a gas turbine supercharger which operates in conjunction with a combustion motor for supplying combustion air thereto. In such instances it is usual that the gas turbine supercharger is connected to the oil circuit of the combustion motor and during the starting up of the motor, great difficulty is encountered in insuring that the supercharger is supplied with sufficient lubricating oil. The turbine of the gas turbine supercharger is immediately charged with exhaust gases and the turbine thus reaches within a relatively short period of time a high speed. In contrast, the lubricating oil supply which is dependent on the combustion motor starts only after a certain delay, due to the length of the lubricating oil line between the combustion motor and dependent on the viscosity of the oil which varies with temperature, and also because the combustion motor itself does not operate as rapidly as the turbine. This is particularly critical in apparatuses where friction or sliding bearings are used and a certain oil pressure is necessary so that a lubricating fluid can develop a bearing supporting force.

It has been found that with a surrounding temperature of around 0° C. up to 20 or 30 seconds will pass until the oil pressure to the supercharger will adjust to the required conditions.

In accordance with the present invention, there is provided a lubricating system which includes means for pressurizing the lubrication line leading directly to the turbine moving parts for an initial period until the lubrication pressure supplied from the combustion motor comes up to a prescribed value. In accordance with one embodiment, the arrangement advantageously includes a reservoir chamber which is connected to the combustion motor lubricating system and to the parts of the turbine requiring lubrication and which includes an expansible portion which may store a temporary lubricating oil supply. During start-up, means are provided, such as a spring, to collapse the expansible chamber and pressurize the fluid line leading to the rotative parts of the gas turbine. During this time, a pressure valve is provided to close off the lubricating line which extends to the combustion motor. The valve is such that once the motor pressure is built up, flow of the lubricating oil from the combustion motor to the turbine for lubrication purposes will be re-established.

In another embodiment of the invention, electromagnetic means are employed either to release a stored energy device such as a spring, or to directly drive an auxiliary pumping member for discharging a reserve quantity of lubrication into the rotative parts of the turbine during an inital period, such as start-up.

Accordingly, it is an object of this invention to provide an improved lubrication system.

A further object of the invention is to provide a lubrication system including means for temporarily pressurizing the lubrication line.

2

A further object of the invention is to provide a lubrication system having means for temporarily pressurizing a lubrication line for a device such as a gas turbine which is supplied from the pressure lubrication system of a combustion motor with which it is associated, including a reservoir chamber having energy means acting to provide a pressure surge in the lubrication line to the turbine for certain periods of time.

A further object of the invention is to provide a lubrication system having a reserve reservoir connected in a lubrication supply line with an expansible bellows adapted to be contracted by a force for temporarily pressurizing the supply line and including electromagnetic means for actuating the force for contracting the bellows.

A further object of the invention is to provide a device which includes electromagnetic means for temporarily pressurizing a lubricating line until the normal pressure of the line builds up to a predetermined amount.

A further object of the invention is to provide a lubricating system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
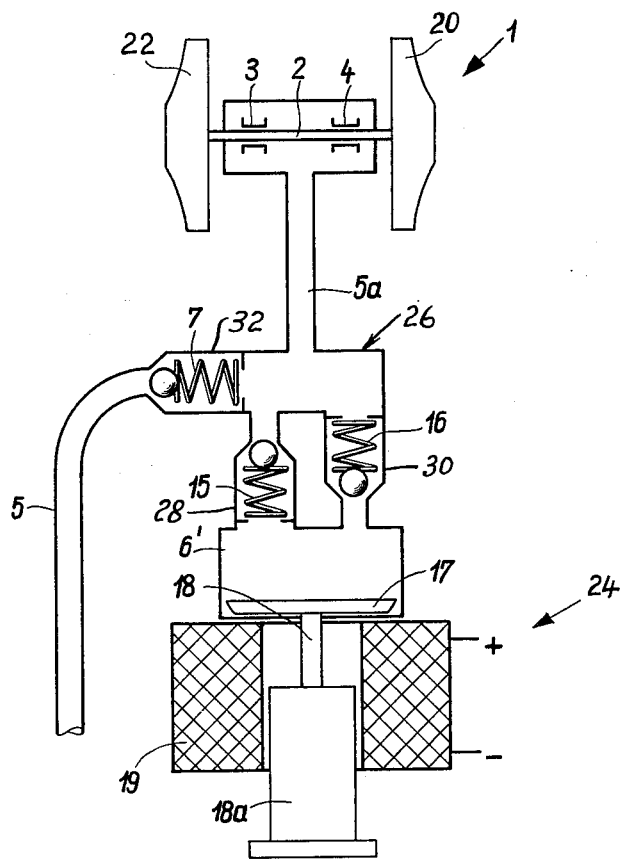

In the drawings:

FIG. 1 is a somewhat schematic transverse section of a lubricating system for a gas turbine supercharger having means for maintaining lubricating pressure to the rotating parts of the turbine until the main lubricating pressure supply is brought up to a predetermined value as constructed in accordance with the invention; and FIG. 2 is a somewhat schematic transverse section of another embodiment of the invention.

Referring to the drawings in particular, the invention embodied therein includes a gas turbine supercharger combination generally designated 1 having the usual turbine wheel 20 and compressor wheel 22 which are connected to a shaft 2 which runs in bearings 3 and 4.

In accordance with the invention, means are provided to insure that sufficient oil is delivered to the line 5a and the bearings 3 and 4 when the line 5 is not sufficiently pressurized by the combustion motor. For this purpose, there is provided a reserve or reservoir oil chamber 6 at the location of the junction of the pressure line 5 and the line 5a. A spring actuated ball check valve 7 permits flow from the line 5 into the reserve chamber 6 only when the pressure in the line 5 exceeds that in the chamber 6.

The reserve chamber or reservoir 6 includes an internal flexible bellows wall 8 having an end portion 8a which is secured to a piston rod 9 having a piston 9b against which is biased a compression spring 11. The other end of the spring 11 is held against a stationary portion or wall 11a.

As indicated in FIG. 1, the spring 11 is fully compressed and the rod 9 is held against axial displacement by a retaining mechanism generally designated 12 which includes a plunger member 12a which fits into a groove 9a on the rod and holds it against lateral displacement under the urging of the spring 11. The plunger member 12a forms a plunger of an electromagnet or solenoid 13 having a winding which is advantageously connected to the ignition system of the combustion motor.

During the starting up of the combustion motor, the solenoid 13 is energized to attract the plunger 12a against the force of a spring 14 to release the rod 9 and permit the spring 11 to urge the bellows to collapse and force oil from the chamber 6 into the conduit 5a and the bearings 3 and 4. In order to insure that the action of the spring is not too rapid or not rapid enough, there is provided a braking valve 10 which permits bleeding of the chamber or reservoir 6 on the sides thereof opposite to the portion which holds the lubricating oil.

Thus, oil is continuously directed to the bearings 3 and 4 until the pressure in the line 5 is built up by bringing up the speed of the combustion motor and the gradual pressurizing of this line. Thereupon, valve 7 is forced open and the bellows 8 returned to the starting position indicated in FIG. 1. This latter is true because the spring 11 and the resilient force of the bellows is such that the normal operating pressure in the line 5 will be sufficient to force it to the extended position. Thereupon, means are provided to release the plunger 12a to permit the spring 14 to urge it into the groove 9a of the rod 9. In some instances, a relay is provided to permit release of the plunger 12a immediately after it has been retracted to release the rod 9.

The braking or adjusting nozzle 10 advantageously includes an orifice adjustment which permits a variation in the time interval at which the lubricating oil in the reservoir 6 will be emptied by collapse of the bellows 8. For this purpose, it is desirable to provide a braking nozzle 10 having an adjustable flow cross sectional portion.

With the construction described in FIG. 1, as soon as the combustion motor is started, lubrication of the bearing areas 3 and 4 is assured by the action of the spring 11 to collapse the bellows 8 and free oil from reservoir 6 to line 5a. It is advantageous to arrange the supply reservoir 6 below the bearing areas 3 and 4 so that the contents of the oil supply container are gradually emptied into the oil supply line 5, in case there is a leakage in the valve 7, for example.

In FIG. 2 there is indicated another embodiment which includes an oil supply container or reservoir generally designated 6' which is constructed in the form of a cylinder of an electric pump generally designated 24. The pump 24 is connected in parallel with the usual supply line or conduit 5 from the combustion motor (not shown) to the lubricating line 5a directed to the bearings 3 and 4 of the gas turbine supercharger generally designated 1 by conduit means generally designated 25. The conduit means includes a portion connecting the pump 24 to the lines 5 and 5a comprising fluid supply line and fluid return line passageways 28 and 30 in which there are provided valves 15 and 16, respectively, and a portion comprising a passageway 32 having spring loaded valve 7'. Valve 16 is a spring loaded ball valve which permits flow of liquid from the pump 24 to the supply line 5a when the pressure in the reservoir 6' exceeds that of the line 5. The valve 15 is closed when the pressure in the pump reservoir 6' exceeds that in the line 5 and the valve 15 is opened when the line 5 pressure exceeds that in the pump chamber 6'. Valve 7 operates in the manner which was described in the previous embodiment.

In the embodiment indicated in FIG. 2, a piston 17 is slidable in the cylindrical reservoir portion 6' and is secured to a plunger 18 of a solenoid having a coil 19. A piston rod armature portion 18a is attracted when the coil 19 is energized to move the piston 17 upwardly in the cylinder reservoir 6' and cause the pumping of liquid through the valve 16 to the supply line 5a and the bearings 3 and 4. The coil 19 is energized whenever the line 5 pressure is below a predetermined value and as soon as it is built up to a predetermined value it is de-energized causing the plunger to return to the position indicated in FIG. 2.

As soon as the combustion motor runs at a normal speed and the pressure in line 5 exceeds an average value for which the supply 15 has been adjusted, the valve 16 opens to permit flow into the cylindrical reservoir portion 6'. This effects backward movement of the piston 17 after the coil 10 has been de-energized.

The cylindrical oil reservoir 6' is advantageously dimensioned so that sufficient oil will be available for multiple starting, if necessary. During any given starting period, it is normal for a piston 17 to move just once in an upward direction to direct a sufficient quantity of oil through the valve 16 and the supply line 5a to the bearings 3 and 4.

While specific embodiments of the invention have been shown and described in detail to illustrate the application of the inventive principles, it will be understood that the invention may be embodied otherwise without departing from such principles.

What is claimed is:

An auxiliary lubricating device for a machine having an ignition system comprising a lubricating line of a bearing system for the machine, a lubricating fluid supply conduit, a lubricating fluid pump, conduit means connecting said lubricating fluid supply conduit and said lubricating fluid pump in parallel relationship and to said bearing system lubricating line, said conduit means including a fluid passageway in direct communication with said supply conduit having a first valve acting to close said supply conduit against return flow, a fluid inlet and a fluid discharge passageway connected to said pump at their one ends and to said lubricating conduit at their opposite ends, said discharge passageway having a second valve for preventing return flow to said pump and including means permitting opening of said second valve for discharging lubricating fluid from said pump to said lubricating line upon exceeding a predetermined pressure, said inlet passageway having a third valve preventing flow from said pump to said supply conduit and including means permitting flow from said supply conduit to said pump only upon the reaching of a predetermined pressure in said supply conduit, a plunger movable in said pump for building up pressure of the lubricating fluid to a value for discharge through said discharge passageway, and electro-magnetic means operatively connected to said plunger for moving said plunger and adapted to be connected to the ignition system of the machine.

References Cited in the file of this patent
UNITED STATES PATENTS

| | | |
|---|---|---|
| 2,225,539 | Persson et al. | Dec. 17, 1940 |
| 2,780,312 | Lebocey | Feb. 5, 1957 |
| 2,867,203 | Easton et al. | Jan. 6, 1959 |

FOREIGN PATENTS

| | | |
|---|---|---|
| 942,234 | Germany | Apr. 26, 1956 |